United States Patent
Campbell

(10) Patent No.: US 7,159,238 B2
(45) Date of Patent: Jan. 2, 2007

(54) ENHANCED BROWSER APPLICATION FOR SERVICE RELATED TO THE TRANSPORTATION OF A MESSAGE

(75) Inventor: Leo J. Campbell, Arlington, VA (US)

(73) Assignee: United States Postal Service, Washington, DC (US)

( * ) Notice: Subject to any disclaimer, the term of this patent is extended or adjusted under 35 U.S.C. 154(b) by 787 days.

(21) Appl. No.: 10/156,862

(22) Filed: May 30, 2002

(65) Prior Publication Data
US 2003/0028764 A1 Feb. 6, 2003

Related U.S. Application Data

(60) Provisional application No. 60/294,001, filed on May 30, 2001.

(51) Int. Cl.
*G06F 1/24* (2006.01)

(52) U.S. Cl. .................. 726/3; 726/6; 726/7

(58) Field of Classification Search .......... 726/3, 726/6, 7
See application file for complete search history.

(56) References Cited

U.S. PATENT DOCUMENTS

| 5,884,246 | A | 3/1999 | Boucher et al. |
| 6,185,600 | B1 * | 2/2001 | Spence et al. ............. 709/203 |
| 6,199,080 | B1 * | 3/2001 | Nielsen ..................... 715/513 |
| 6,304,898 | B1 * | 10/2001 | Shiigi ........................ 709/206 |

* cited by examiner

*Primary Examiner*—Thomas R. Peeso
(74) *Attorney, Agent, or Firm*—Lucius L. Lockwood; Lewis and Roca LLP

(57) ABSTRACT

A universal browser operates in conjunction with an underlying browser to provide a user of a PC with access to an enhanced service. The enhanced service can be post-marking for an electronic communication, encryption, or some other service or product offered by the universal browser provider. The universal browser is displayed as a frame, on a tool-bar, on a pull-down menu, as an icon, or the like on a page that has been accessed by the underlying browser.

24 Claims, 2 Drawing Sheets

Secure Universal Postal Encrypted Resource (SUPER) Browser

Step 1:

Step 2:

Step 3:

ENHANCED BROWSER APPLICATION FOR SERVICE RELATED TO THE TRANSPORTATION OF A MESSAGE

RELATED APPLICATION

This non-provisional application claims priority from provisional application No. 60/294,001, filed on May 30, 2001.

FIELD OF THE INVENTION

This invention relates generally to systems and methods for providing computer browsers and, more particularly, to a secure, universal, postal, encrypted resource browser for use in a desktop computing environment.

BACKGROUND OF THE INVENTION

A browser is a utility on a computer, such as a personal computer (PC), that allows a user of the PC to find and activate sites on the World Wide Web (i.e., websites). Current examples of browsers that are in wide use today include Netscape Navigator, Microsoft Internet Explorer, and America Online Netscape Browser.

It is desired to provide a universal browser, compatible with common commercial browsers, that can incorporate preferences and applications unique to the universal browser provider. Examples of the types of unique preferences and applications that may be incorporated include an electronic postmark for an electronic communication, encryption for an electronic communication, and other products or services that may be accessed/purchased by a user of the universal browser. The present invention satisfies these needs and provides other, related, advantages.

SUMMARY OF THE INVENTION

It is an object of the present invention to provide a universal browser, compatible with common commercial browsers, that incorporates preferences and/or applications unique to the universal browser provider.

It is a further object of the present invention to provide a universal browser that provides a user with the ability to place an electronic postmark on an electronic communication.

It is a still further object of the present invention to provide a universal browser that provides a user with the ability to encrypt an electronic communication.

It is yet a further object of the present invention to provide a universal browser that provides a user with the ability to access/purchase products or services that are unique to the universal browser provider and that are not available to the user of the underlying or standard common commercial browser.

BRIEF DESCRIPTION OF THE PREFERRED EMBODIMENTS

In accordance with one embodiment of the present invention, a computer program product is disclosed. The computer program product comprises signal-bearing media containing program instructions for execution within a general purpose computer, in conjunction with a standard browser application, wherein said program instructions comprise program instructions for: launching a universal browser each time the standard browser is executed; and offering a unique enhanced service to the user via a graphical area within a window of the standard browser.

In accordance with another embodiment of the present invention, a method for browsing on a computer network is disclosed. The method comprises program instructions for: launching a universal browser each time a standard browser is executed; and offering a unique enhanced service to the user via a graphical area within a window of the standard browser.

In accordance with yet another embodiment of the present invention, a computer network browsing system is disclosed. The system comprises: a memory for storing program instructions and data; a processor coupled to said memory for executing said program instructions, wherein said program instructions include program instructions for coupling a universal browser to an underlying browser already on a user's computer; launching the universal browser each time the underlying browser is executed; and offering an enhanced service to the user via the universal browser wherein the enhanced service is not available via the underlying browser.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

The present invention relates to a system and method that works with an underlying browser to provide a PC user with the ability to perform certain specialized tasks. The underlying browser is preferably a common commercial browser. Examples of current common commercial browsers include Netscape Navigator, Microsoft Internet Explorer, and America Online Netscape Browser.

The system and method of the present invention can be embodied, as desired, as a universal browser compatible with one or more underlying browsers, as a plug-in, or the like. Accordingly, the term "universal browser," as used herein, is intended to include within its scope any software program adapted to cooperate with an underlying browser to provide a PC user with the ability to perform certain specialized tasks, as herein described.

Figure 1:
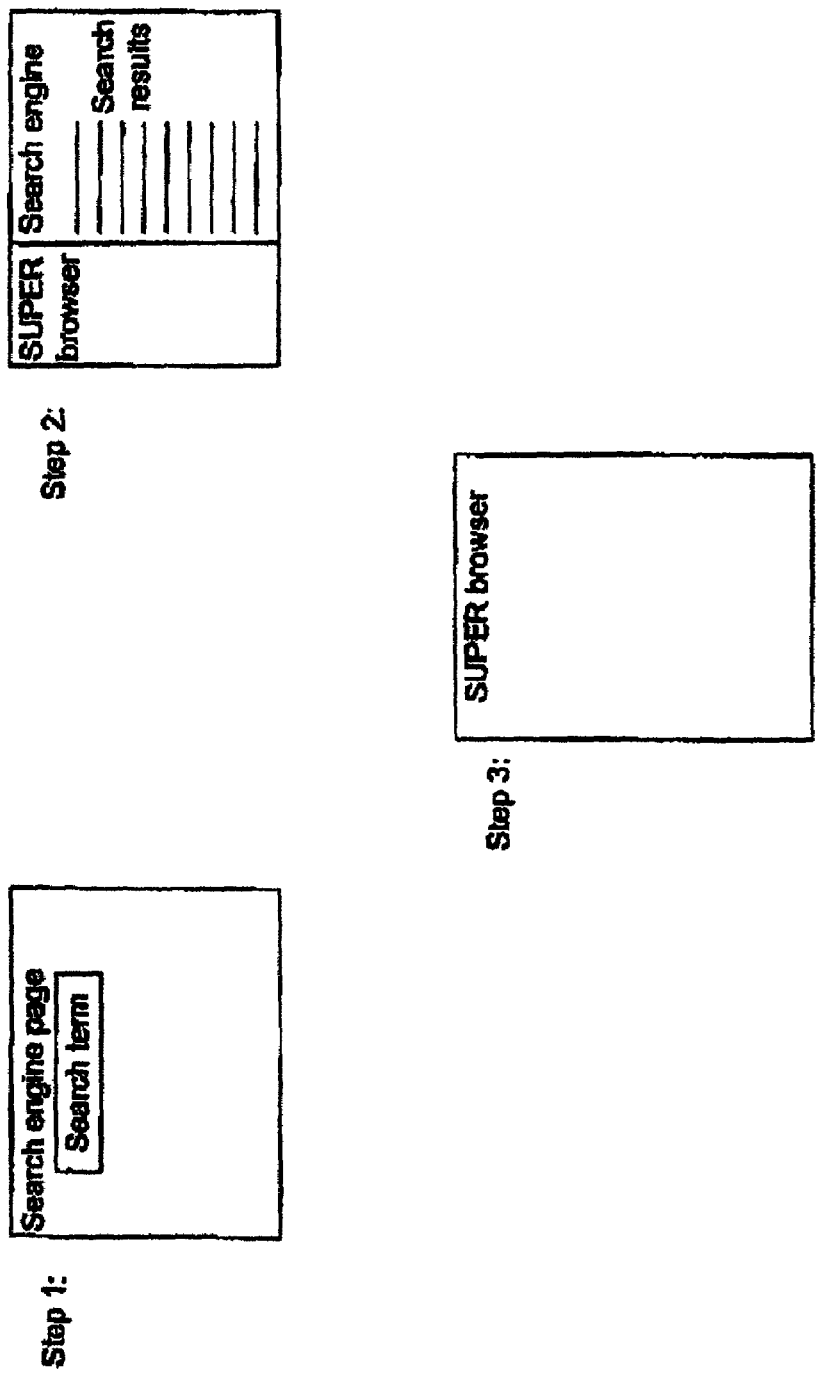
FIG. 1 is an illustration of successive computer screen images visible to a user of a universal browser consistent with the present invention.

As shown in FIG. 1, once the universal browser is installed on the user's computer, when the user deploys the underlying browser (Step 1), the universal browser is automatically deployed. The universal browser may be deployed on a portion of the screen (Step 2) as a frame. Alternatively, it may be preferred to deploy the universal browser as an icon, on a tool bar, or otherwise within a page displayed by the underlying browser, rather than within a separate frame. The universal browser should either be visible or at least readily accessible at all times as long as the underlying browser is deployed.

The universal browser works with the underlying browser to allow the user to set preferences. One example includes the setting of search preferences. Where this is done, the results of a search performed using the underlying browser will be narrowed based on the preferences set in the universal browser. See FIG. 2. One example of search preferences would be websites that have been configured to provide specialized information to users having a universal browser on their PC.

Another example of preference setting is the storing of favorite websites (i.e., the Uniform Resource Locator (URL) of favorite websites) or the sites where a user does a lot of his or her business. These favorite sites can be invoked using icons in the universal browser frame, icons in the underlying browser screen, a pull-down menu accessible from the toolbar displayed on the underlying browser screen, or in any other desired fashion.

The universal browser can also provide the user with the ability to access applications that are unique to the universal browser provider. Examples of such unique applications include an electronic postmark for an electronic communication, encryption for an electronic communication, and the offer of products or services.

With respect to the electronic postmark example, an icon can be provided—whether in a separate frame, as an icon on the displayed page itself, as a button on a tool-bar, in a pull-down menu, or otherwise—that permits a user to place an electronic postmark on an electronic communication that is being transmitted. Such an electronic postmark would provide a user with proof that a message has been sent. The postmark could include information regarding the size of the message, the date and time sent, the location of the sender, the location of the recipient, and any other desired information.

It is desired to make the universal browser secure. This is accomplished by providing each user with a unique certificate (e.g., a digital certificate). The certificate could be issued by the universal browser provider or other private key system. The certificate allows a user to digitally sign documents and also to engage in secure payment transactions with the provider or other third party. The certificate also facilitates the encryption of an electronic communication, another preferred feature of the present invention.

The universal browser may be provided through a physical medium, such as a CD-ROM, a disk, or otherwise. It could also be made available through a web-site, where it can be accessed for downloading and installation on a user's PC. It could also be pre-loaded on the hard drive of a computer prior to sale. The universal browser could be provided free of charge.

Figure 2:
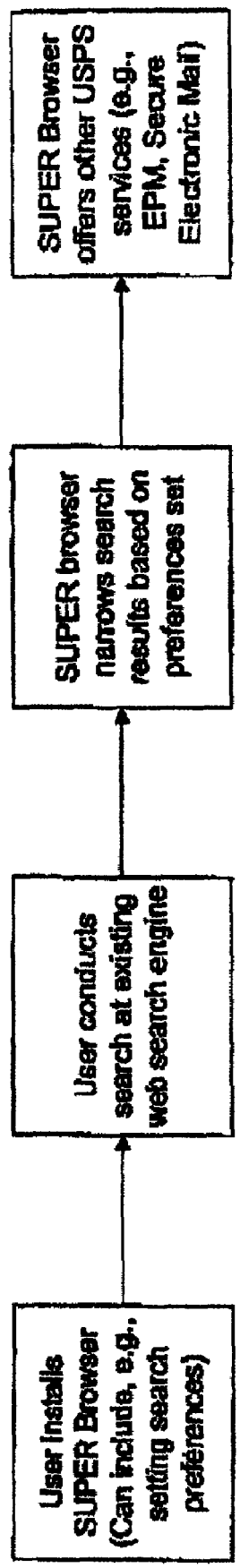
FIG. 2 is a flow chart illustrating use of a universal browser consistent with the present invention.

As shown in FIG. 2, the universal browser offers to users convenient access to the universal browser provider's products and services. Where the universal browser provider is a postal service, this would be similar to, in the physical world, walking out the front door of your home and having a post office front door open to you right away. In other words, all the time a user is on the computer on a browser (e.g., transmitting messages or documents), the user sees the universal browser right there, offering an array of products and/or services. The user could decide whether or not a document or message should have postal service protections and can request such protections through the universal browser.

While the invention has been particularly shown and described with reference to preferred embodiments thereof, it will be understood by those skilled in the art that the foregoing and other changes in form and details may be made therein without departing from the spirit and scope of the invention.

I claim:

1. A method comprising:
   receiving a first query from a user of a computing device, wherein:
   the computing device has launched first and second browser applications respectively installed on the computing device; and
   the second browser application is automatically launched with the launching of the first browser application;
   forming a transmission including the first query for transmitting to a computer network in communication with the computing device, wherein:
   the computer network includes a plurality of servers each hosting a plurality of web sites; and
   each web site is respectively in communication with stored information;
   receiving a transmission at the computing device from the computer network, wherein:
   the transmission includes a first result set; and
   the first result set includes the stored information in communication with the web sites that corresponds to the first query;
   accessing, with said second browser application, a preference set in communication with the computing device, wherein the preference set includes a second query for a service related to the transportation of a message from the user;
   forming a second result set from the first result set, wherein the second result includes the stored information in the first result set that corresponds to the second query; and
   render for display on a display device in first and second graphical display area, respectively, the first and second result sets.

2. The method as defined in claim 1, wherein:
   the message from the user is for delivery with an envelope or parcel; and
   the service related to the transportation of the message from the user is represented by a label typically affixed to the envelope or parcel for the service of the transporting the envelope or parcel.

3. The method as defined in claim 1, wherein:
   the message from the user is for delivery in an electronic communication; and
   the service related to the transportation of the message from the user is the generation of an electronic postmark for the electronic communication.

4. The method as defined in claim 3, further comprising at the computing device:
   forming the electronic communication;
   applying the electronic postmark to the electronic communication; and
   forming a transmission including the electronically postmarked electronic communication for transmitting to the computer network.

5. The method as defined in claim 1, wherein:
   the message from the user is for delivery in an electronic communication; and
   the service related to the transportation of the message from the user is the encryption of the electronic communication.

6. The method as defined in claim 5, further comprising at the computing device:
   forming the electronic communication;
   encrypting the electronic communication; and forming a transmission including the encrypted communication for transmitting to the computer network.

7. The method as defined in claim 1, wherein the message from the user is for delivery in an electronic communication to a secure electronic mailbox.

8. The method as defined in claim 7, further comprising at the computing device:
forming the electronic communication;
encrypting the electronic communication; and
forming a transmission, addressed to the secure electronic mailbox, for transmitting to the computer network.

9. The method as defined in claim 1, wherein:
the message from the user is a certificate component; and
the service related to the transportation of the message from the user is for the authentication of the certificate component.

10. The method as defined in claim 1, wherein:
the message from the user is a certificate component; and
the service related to the transportation of the message from the user is engaging in a secure payment transaction with the provider of the service.

11. A computer readable media comprising instructions which when executed by a computer performs the method of claim 1.

12. A system comprising:
means for receiving a first query from a user of a computing device, wherein:
the computing device has launched first and second browser applications respectively installed on the computing device; and
the second browser application is automatically launched with the launching of the first browser application;
means for forming a transmission including the first query for transmitting to a computer network in communication with the computing device, wherein:
the computer network includes a plurality of servers each hosting a plurality of web sites; and
each web site is respectively in communication with stored information;
receiving a transmission at the computing device from the computer network, wherein:
the transmission includes a first result set; and
the first result set includes the stored information in communication with the web sites that corresponds to the first query;
means for accessing, with said second browser application, a preference set in communication with the computing device, wherein the preference set includes a second query for a service related to the transportation of a message from the user;
means for forming a second result set from the first result set, wherein the second result includes the stored information in the first result set that corresponds to the second query; and
means for rendering on a display device in first and second graphical display area, respectively, the first and second result sets.

13. The system as defined in claim 12, wherein:
the message from the user is for delivery with an envelope or parcel; and
the service related to the transportation of the message from the user is represented by a label typically affixed to the envelope or parcel for the service of the transporting the envelope or parcel.

14. The system as defined in claim 12, wherein:
the message from the user is for delivery in an electronic communication; and
the service related to the transportation of the message from the user is the generation of an electronic postmark for the electronic communication.

15. The system as defined in claim 14, further comprising at the computing device:
forming the electronic communication;
applying the electronic postmark to the electronic communication; and
forming a transmission including the electronically postmarked electronic communication for transmitting to the computer network.

16. The system as defined in claim 12, wherein:
the message from the user is for delivery in an electronic communication; and
the service related to the transportation of the message from the user is the encryption of the electronic communication.

17. The system as defined in claim 16, further comprising at the computing device:
forming the electronic communication;
encrypting the electronic communication; and
forming a transmission including the encrypted communication for transmitting to the computer network.

18. The system as defined in claim 12, wherein the message from the user is for delivery in an electronic communication to a secure electronic mailbox.

19. The system as defined in claim 18, further comprising at the computing device:
forming the electronic communication;
encrypting the electronic communication; and
forming a transmission, addressed to the secure electronic mailbox, for transmitting to the computer network.

20. The system as defined in claim 12, wherein:
the message from the user is a certificate component; and
the service related to the transportation of the message from the user is for the authentication of the certificate component.

21. The system as defined in claim 12, wherein:
the message from the user is a certificate component; and
the service related to the transportation of the message from the user is engaging in a secure payment transaction with the provider of the service.

22. A computer program product, tangibly embodied in an information carrier, for propagation within a network, the computer program product comprising instructions being operable to cause a general purpose computer to:
receive a first query from a user of the general purpose computer, wherein:
the general purpose computer has launched first and second browser applications respectively installed on the general purpose computer; and
the second browser application is automatically launched with the launching of the first browser application;
form a transmission including the first query for transmitting to a computer network in communication with the general purpose computer, wherein:
the computer network includes a plurality of servers each hosting a plurality of web sites; and
each web site is respectively in communication with stored information;

receiving a transmission at the general purpose computer from the computer network, wherein:
  the transmission includes a first result set; and
  the first result set includes the stored information in communication with the web sites that corresponds to the first query;
access, with said second browser application, a preference set in communication with the general purpose computer, wherein:
  the preference set includes a second query for a service related to the transportation of a message from the user;
  the message from the user is for delivery with an envelope or parcel; and
  the service related to the transportation of the message from the user is represented by a label typically affixed to the envelope or parcel for the service of the transporting the envelope or parcel;
form a second result set from the first result set, wherein the second result includes the stored information in the first result set that corresponds to the second query; and
render for display on a display device in first and second graphical display area, respectively, the first and second result sets.

23. The computer program product as defined in claim 22, wherein:
  the message from the user is a certificate component; and
  the service related to the transportation of the message from the user is for the authentication of the certificate component.

24. The computer program product as defined in claim 22, wherein:
  the message from the user is a certificate component; and
  the service related to the transportation of the message from the user is engaging in a secure payment transaction with the provider of the service.

* * * * *